United States Patent
Xiang et al.

(10) Patent No.: US 12,147,429 B2
(45) Date of Patent: Nov. 19, 2024

(54) METHOD AND DEVICE OF DATA TRANSMISSION

(71) Applicant: HEFEI SWAYCHIP INFORMATION TECHNOLOGY INC., Anhui (CN)

(72) Inventors: Junling Xiang, Beijing (CN); Min Zhou, Beijing (CN); Ruimin Liu, Beijing (CN)

(73) Assignee: HEFEI SWAYCHIP INFORMATION TECHNOLOGY INC., Anhui (CN)

( * ) Notice: Subject to any disclaimer, the term of this patent is extended or adjusted under 35 U.S.C. 154(b) by 0 days.

(21) Appl. No.: 18/267,251

(22) PCT Filed: Dec. 17, 2021

(86) PCT No.: PCT/CN2021/139205
§ 371 (c)(1),
(2) Date: Jun. 14, 2023

(87) PCT Pub. No.: WO2023/045134
PCT Pub. Date: Mar. 30, 2023

(65) Prior Publication Data
US 2024/0045869 A1    Feb. 8, 2024

(30) Foreign Application Priority Data
Sep. 26, 2021 (CN) .......................... 202111127858.0

(51) Int. Cl.
*G06F 15/16* (2006.01)
*G06F 16/2455* (2019.01)
*G06F 16/27* (2019.01)

(52) U.S. Cl.
CPC .. *G06F 16/24552* (2019.01); *G06F 16/24553* (2019.01); *G06F 16/27* (2019.01)

(58) Field of Classification Search
None
See application file for complete search history.

(56) References Cited

U.S. PATENT DOCUMENTS 6,370,621 B1    4/2002   Keller
10,037,299 B1 *  7/2018  Ramey ............... G06F 13/4221
(Continued)

FOREIGN PATENT DOCUMENTS

CN    103441948 A    12/2013
CN    205983466 U     2/2017
(Continued)

OTHER PUBLICATIONS

Knoben, Software caching for tree-based algorithms on accelerator cards, Jun. 2021, pp. 1-64.*
(Continued)

*Primary Examiner* — Alex Gofman
(74) *Attorney, Agent, or Firm* — Schmeiser, Olsen & Watts LLP

(57) ABSTRACT

A method and device of data transmission, applied to a distributed database is provided including a plurality of nodes, with accelerator cards provided in at least two of the nodes, the high-speed interfaces of each the accelerator card is interconnected to form a data transmission path, the method including: when the accelerator card receives a database operation command from the CPU of the node requesting access to the target data, generating a data request based on the get data operation or the modify data operation; the accelerator card detects hit the target data in the cache based on the data request, the accelerator card fetches the target data from the cache; otherwise the accelerator card sends a data request message corresponding to the data request to a distant destination node via the data transmission path, and obtains the target data based on the data packet returned from the destination node.

7 Claims, 3 Drawing Sheets

(56) References Cited

U.S. PATENT DOCUMENTS

| | | | |
|---|---|---|---|
| 2009/0210626 A1 | 8/2009 | Papazova et al. | |
| 2009/0240664 A1 | 9/2009 | Dinker et al. | |
| 2016/0020850 A1* | 1/2016 | Youn | H04J 3/1652 |
| | | | 398/5 |
| 2017/0147491 A1* | 5/2017 | Deguchi | G06F 12/0806 |
| 2018/0020054 A1 | 1/2018 | Woodacre et al. | |
| 2018/0351811 A1* | 12/2018 | Taheri | H04L 47/127 |
| 2020/0057819 A1* | 2/2020 | Mathur | G06F 16/2471 |
| 2020/0213199 A1* | 7/2020 | Sethi | H04L 41/40 |
| 2021/0124658 A1* | 4/2021 | Lan | G06F 11/2071 |

FOREIGN PATENT DOCUMENTS

| | | |
|---|---|---|
| CN | 108183961 A | 6/2018 |
| CN | 109714292 A | 5/2019 |
| CN | 111464615 A | 7/2020 |

OTHER PUBLICATIONS

International Search Report issued Apr. 26, 2022 for PCT/CN2021/139205.

* cited by examiner

METHOD AND DEVICE OF DATA TRANSMISSION

CROSS-REFERENCE TO RELATED APPLICATIONS

This application claims priority to PCT Application No. PCT/CN2021/139205, having a filing date of Dec. 17, 2021, which claims priority to CN Application No. 202111127858.0, having a filing date of Sep. 26, 2021, the entire contents of both of which are hereby incorporated by reference.

FIELD OF TECHNOLOGY

The following relates to the field of database technology, more specifically, to a method and device of data transmission.

BACKGROUND

With the advent of 5G, Cloud Computing, Internet of Everything and Artificial Intelligence era, data generation, transmission, storage and analysis and processing requirements increasingly high. In the field of database, the large data volume of lake warehouse integration is accompanied by new demands for system performance, scalability and cost, and distributed database is the key solution. At the same time, within the node, accelerator cards such as GPU (graphics processing unit), FPGA (Field Programmable Gate Array) or custom ASIC (Application Specific Integrated Circuit) chips are used to implement key processing steps in the database through specially designed hardware circuits to further meet the overall performance, as well as cost and scalability requirements.

At present, the accelerator card in a single node communicates with the CPU (central processing unit) through the PCIe (peripheral component interconnect express) interface, and the PCIe interface has a large latency, which largely offsets the processing latency gain brought by the accelerator card. Currently, many industry organizations have developed interface protocol specifications such as CXL (Compute Express Link) and CCIX (Cache Coherent Interconnect for Accelerators) based on the PCIe interface to reduce the communication latency between accelerator cards and CPUs. However, when the accelerator card is deployed in a distributed database scenario, for example, node A transmits data to node B, node A data needs to be passed to the host through the PCIe interface, then to the NIC and transmitted to the destination node B. The destination node B then takes the data from the NIC and sends it to the accelerator card through the PCIe interface, which further increases the communication latency between the accelerator cards.

In the existing technology, a new interface protocol is implemented by extending the PCIe interface with a new transaction layer to reduce the interface communication latency between the accelerator card and the CPU. CXL is one of them. It achieves this by having a built-in cache coherence protocol and unifying the pooling of CPU memory and accelerator card memory. However, CXL only solves the intra-node communication latency, but not the cross-node communication, and is not designed for database applications.

In addition, in order to reduce the cross-node access latency, existing techniques also use direct access to the memory of other nodes at remote locations. RDMA (Remote Direct Memory Access) usually leaves protocol layers such as TCP/IP to the hardware and removes the need for multiple copies of data from the software. The entire RDMA data transmission process bypasses the operating system and does not require CPU participation, which greatly improves transfer efficiency and reduces transfer latency. However, RDMA only solves the inter-node access latency, but not the intra-node acceleration card latency, and it is not designed for database applications.

Therefore, how to reduce the communication latency between accelerator cards in a distributed environment is an urgent technical problem.

SUMMARY

An aspect relates to a data transmission method to solve the technical problem that the communication delay between accelerator cards cannot be effectively reduced in a distributed environment in the conventional art.

The method applied to a distributed database comprising a plurality of nodes, with accelerator cards provided in at least two of the nodes, characterized in that, the high-speed interfaces of each the accelerator card is interconnected to form a data transmission path, the method comprising:

when the accelerator card receives a database operation command from the CPU of the node requesting access to the target data, generating a data request based on the get data operation or the modify data operation;

the accelerator card detects whether the target data is hit in the cache based on the data request;

if it is hit, the accelerator card fetches the target data from the cache if it is not hit, the accelerator card sends a data request message corresponding to the data request to a distant destination node via the data transmission path, and obtains the target data based on the data packet returned from the destination node;

wherein the get data operation includes a scan action, the modify data operation includes Insert, update and delete actions, and the data request includes the information of the destination node, the content of the target data and the data volume of the target data.

In some embodiments of this application, obtaining the target data based on the data packet returned from the destination node, specifically:

the operation of generating a data request is implemented and executed based on information about the distribution of each slice of the target data, information about the cached data in the cache in the accelerator card, information about the communication bandwidth and latency of each the node, and subsequent execution operations corresponding to the target data;

the accelerator card taking the net load of data extracted from the packets as target data and storing the target data in the cache based on a cache coherency protocol.

In some embodiments of this application, the target data saved based on the cache coherency protocol is identified by a slice node identification, a transaction ID, a transaction status, a database ID, a table ID, a data block, and a tuple.

In some embodiments of this application, the method further comprises:

the accelerator card completes memory registration and queue management based on RDMA protocol.

In some embodiments of this application, method further comprises:

when the accelerator card receives a data request message from a remote requesting node, detecting whether the target data is hit in the cache based on the data request message;

if it is hit, the accelerator card extracts the target data from the cache and transmits the target data back to the requesting node via the data transmission path;

if it is not hit, the accelerator card fetches the target data from the external memory and saves the target data in the cache based on the cache coherency protocol and fetches the target data from the cache and transmits the target data back to the requesting node via the data transmission path.

In some embodiments of this application, the method further comprises:

when the accelerator card receives a database operation instruction from the CPU to modify a temporary intermediate result, completing the modification of the temporary intermediate result based on the contents of the cache;

when the accelerator card receives a database operation instruction from the CPU to modify the original data, modifying the original data based on the slice information of the original data, and saving the modified original data in the cache based on a cache coherency protocol.

Accordingly, embodiments of the present invention also provide a device of data transmission, applied to a distributed database comprising a plurality of nodes, with accelerator cards provided in at least two of the nodes, the high-speed interfaces of each the accelerator card is interconnected to form a data transmission path, the device is set in the accelerator card, comprising:

a data management module, generating a data request based on the get data operation or the modify data operation, sending the data request to a cache memory management module and receiving an indication of received target data returned by the cache memory management module;

a data slicing module, completing the slicing of database data according to a predetermined slicing principle and then storing each slice in the external memory of each node, and providing the data management module with information on the distribution of each slice;

the cache memory management module, detecting whether the target data is hit in the cache based on the data request, and fetching the target data from the cache when it is hit, and sending the data request to the data transmission module and fetching the target data received by the data transmission module from the destination node when it is not hit.

the data transmission module, packing and unpacking data, as well as sending and receiving data request messages corresponding to the data request through the data transmission path, and transmitting data at a predetermined data granularity based on the type of the cache interface;

wherein the get data operation comprises a scan action, the modify data operation comprises insert, update and delete actions, and the data request comprises the information of the destination node, the content of the target data and the data volume of the target data.

In some embodiments of this application, the data management module, the data slicing module, the cache memory management module, the data transmission module and the cache comprise a storage engine of the accelerator card, the accelerator card further comprising an execution engine, the data management module returning the target data, or modified interim results, or modified original data to the execution engine, to cause the execution engine to execute database operation instructions issued by the CPU of the node.

In some embodiments of this application, the cache memory management module receives data packets returned from the destination node and uses the net load of data extracted from the packets as target data, and saves the target data in the cache based on a cache coherency protocol, and completes memory registration and queue management based on an RDMA protocol;

wherein the target data saved based on the cache coherency protocol is identified by a slice node identification, a transaction ID, a transaction status, a database ID, a table ID, a data block, and a tuple.

In some embodiments of this application, the data transmission module pre-establishes a guaranteed bandwidth OSUFlex/ODUflex pipe for each pair of nodes based on OTN interface or adds node ID identification to the ODUflex/OSUflex frame header for routing based on OTN interface.

In some embodiments of this application, the accelerator card is connected to the CPU based on PCIe interface, the accelerator card is also connected to a solid state drive.

By applying the above technical solution, in a distributed database including multiple nodes, at least two nodes are equipped with accelerator cards, and the high-speed interfaces of each the accelerator card is interconnected to form a data transmission path, when the accelerator card receives a database operation command from the CPU of the node requesting access to the target data, generating a data request based on the get data operation or the modify data operation; the accelerator card detects whether the target data is hit in the cache based on the data request; if it is hit, the accelerator card fetches the target data from the cache; if it is not hit, the accelerator card sends a data request message corresponding to the data request to a distant destination node via the data transmission path, and obtains the target data based on the data packet returned from the destination node; wherein the data request includes the information of the destination node, the content of the target data and the data volume of the target data, which is directly interconnected by the high-speed interface of each accelerator card, so that each accelerator card can cache the data of the remote node, which reduces the communication delay between accelerator cards across nodes, improves the efficiency of data sharing among distributed database slices and reduces the constraint of data slicing.

BRIEF DESCRIPTION

Some of the embodiments will be described in detail, with references to the following Figures, wherein like designations denote like members, wherein.

DETAILED DESCRIPTION

The following is a clear and complete description of the technical solutions in the embodiments of the present application in conjunction with the accompanying drawings of the embodiments of the present application, obviously, the described embodiments are only a part of the embodiments of the present application, but not all of them. Based on the embodiments in this application, all other embodiments obtained by a person of ordinary skill in the conventional art without creative labor fall within the scope of protection of this application.

The embodiments of this application provide a method of data transmission, applied to a distributed database comprising a plurality of nodes, with accelerator cards provided in at least two of the nodes, the high-speed interfaces of each the accelerator card is interconnected to form a data transmission path. The accelerator card can be an external hardware accelerator, which is a hardware-based device for acceleration, including GPU, or FPGA, or ASIC. The high-speed interface can be an Ethernet interface, an Infiniband interface, an FC (Fiber Channel) interface, or an OTN (Optical Transport Network) interface.

Figure 2:
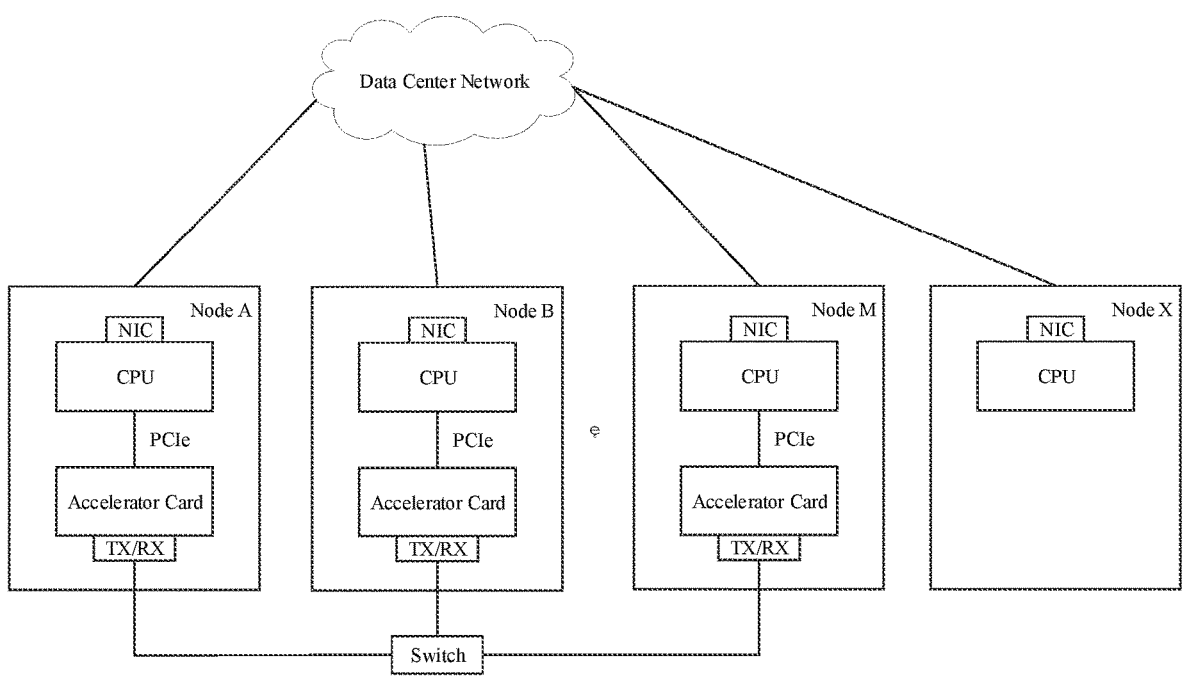
FIG. 2 illustrates a schematic diagram of the structure of a distributed database in an embodiment of the present invention.

As shown in FIG. 2, the structure of the distributed database in an embodiment of the present invention includes a plurality of nodes (Node A, Node B, Node M and Node X), and each node is connected to the data center network through the NIC of the network card, wherein Node A, Node B and Node M are equipped with an accelerator card, which is connected to the CPU through the PCIe interface, and the high-speed interfaces TX/RX of each accelerator card are connected to each other through the external switch to form a high-speed interconnected data transmission path.

Figure 1:
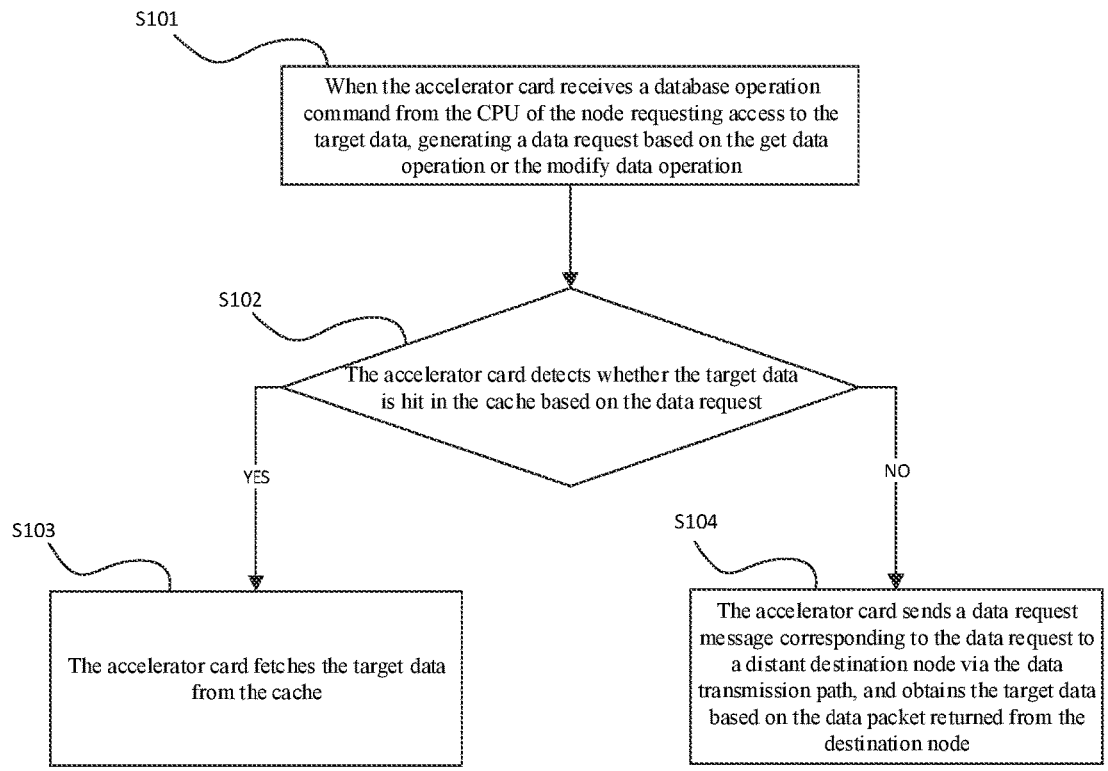
FIG. 1 illustrates a flow diagram of a method of data transmission proposed by an embodiment of the present invention.

As shown in FIG. 1, the method also comprises the steps of:

Step S101, when the accelerator card receives a database operation command from the CPU of the node requesting access to the target data, generating a data request based on the get data operation or the modify data operation.

In this embodiment, the accelerator card is connected to the CPU of the node to which it belongs, and the cache is set in each accelerator card, the cache interface of each accelerator card is connected to each other to form a data transmission path, and the database data is distributed in each node of the database according to a predetermined slicing principle, which can be slicing by range or by consistent hash algorithm.

When a database operation command is received from the CPU to obtain the target data, the accelerator card generates a data request based on the get data operation or the modify data operation, the get data operation includes the scan action, the modify data operation includes the Insert, update and delete actions, and the data request includes the information of the destination node, the content of the target data and the data volume of the target data.

Step S102, the accelerator card detects whether the target data is hit in the cache based on the data request, if it is hit, step S103 is executed; otherwise, step S104 is executed.

In this embodiment, after the accelerator card generates a data request, it first checks whether the target data is hit in the cache.

Step S103, the accelerator card fetches the target data from the cache.

In this embodiment, if the target data is detected in the cache, the accelerator card can fetch the target data directly from the cache, which improves the efficiency of data acquisition.

Step S104, the accelerator card sends a data request message corresponding to the data request to a distant destination node via the data transmission path, and obtains the target data based on the data packet returned from the destination node.

In this embodiment, if the target data is not hit in the cache, which means that the target data does not exist in this node, the data request message is generated based on the data request, and the data request message is sent to the remote destination node with the target data via the data transmission path, and the accelerator card in the destination node receives the data request message and returns the data packet with the target data via the data transmission path to obtain the target data.

In order to ensure cache consistency, in some embodiments of this, obtaining the target data based on the data packet returned from the destination node, specifically:

the operation of generating a data request is implemented and executed based on information about the distribution of each slice of the target data, information about the cached data in the cache in the accelerator card, information about the communication bandwidth and latency of each the node, and subsequent execution operations corresponding to the target data;

the accelerator card taking the net load of data extracted from the packets as target data and storing the target data in the cache based on a cache coherency protocol.

In this embodiment, based on information about the distribution of each slice of the target data, information about the cached data in the cache in the accelerator card, information about the communication bandwidth and latency of each the node, and subsequent execution operations corresponding to the target data, the accelerator card receives the data packet returned from the destination node, extracts the net load of the data in the packet as the target data, and then saves the target data in the cache-consistent protocol.

Wherein the distribution information stored in each slice of the target data is the distribution of the target data in each node; the cached data information of the cache can include the current space capacity information, the cached data information (nodes, tables and data blocks related to the data), and the subsequent execution operations corresponding to the target data are the subsequent operations that need to be executed when executing the database operation instructions, such as scanning, joining, sorting and aggregation operations.

In order to ensure cache consistency, in some embodiments of this, the target data saved based on the cache coherency protocol is identified by a slice node identification, a transaction ID, a transaction status, a database ID, a table ID, a data block, and a tuple. In this embodiment, the corresponding cache coherency is not the usual cache coherency associated with memory addresses within the CPU.

To further improve the efficiency of data processing, in some embodiments of the present application, the method further comprises:

the accelerator card completes memory registration and queue management based on RDMA protocol.

To further improve the efficiency of data processing, in some embodiments of the present application, the method further comprises:

when the accelerator card receives a data request message from a remote requesting node, detecting whether the target data is hit in the cache based on the data request message;

if it is hit, the accelerator card extracts the target data from the cache and transmits the target data back to the requesting node via the data transmission path;

if it is not hit, the accelerator card fetches the target data from the external memory and saves the target data in the cache based on the cache coherency protocol and fetches the target data from the cache and transmits the target data back to the requesting node via the data transmission path.

In this embodiment, when the accelerator card receives a data request message from a remote requesting node, it means that the remote requesting node requests for the target data in this accelerator card, and the node to which the accelerator card belongs is the destination node, which first detects whether the target data is hit in the cache, if it is hit, the accelerator card extracts the target data from the cache and transmits the target data back to the requesting node via the data transmission path; if it is not hit, the accelerator card first gets the target data from the external memory, then saves the target data in the cache based on the cache coherency protocol, then extracts the target data from the cache and transmits the target data back to the requesting node via the data transmission path.

It is understood that, the accelerator card receives the data request message from the remote requesting node via the data transmission path.

In order to reliably execute the database operation instructions that require data modification, in some embodiments of the present, the method further comprises:

when the accelerator card receives a database operation instruction from the CPU to modify a temporary intermediate result, completing the modification of the temporary intermediate result based on the contents of the cache;

when the accelerator card receives a database operation instruction from the CPU to modify the original data, modifying the original data based on the slice information of the original data, and saving the modified original data in the cache based on a cache coherency protocol.

In this embodiment, the database operation of data modification includes adding, deleting, and changing data, and the data modification is divided into modification of temporary intermediate results and modification of original data, when the accelerator card receives a database operation instruction from the CPU to modify the temporary intermediate results, the temporary intermediate results are local data, and there is no consistency problem, and the contents of the cache are directly operated to complete the modification of the temporary intermediate results; when the accelerator card receives a database operation command from the CPU to modify the original data, it first modifies the original data based on the slice information of the original data, and then saves the modified original data in the cache based on the cache consistency protocol to ensure the data consistency of the cache.

By applying the above technical solution, in a distributed database including multiple nodes, at least two nodes are equipped with accelerator cards, and the high-speed interfaces of each the accelerator card is interconnected to form a data transmission path, when the accelerator card receives a database operation command from the CPU of the node requesting access to the target data, generating a data request based on the get data operation or the modify data operation; the accelerator card detects whether the target data is hit in the cache based on the data request; if it is hit, the accelerator card fetches the target data from the cache; if it is not hit, the accelerator card sends a data request message corresponding to the data request to a distant destination node via the data transmission path, and obtains the target data based on the data packet returned from the destination node; wherein the data request includes the information of the destination node, the content of the target data and the data volume of the target data, which is directly interconnected by the high-speed interface of each accelerator card, so that each accelerator card can cache the data of the remote node, which reduces the communication delay between accelerator cards across nodes, improves the efficiency of data sharing among distributed database slices and reduces the constraint of data slicing.

Figure 3:
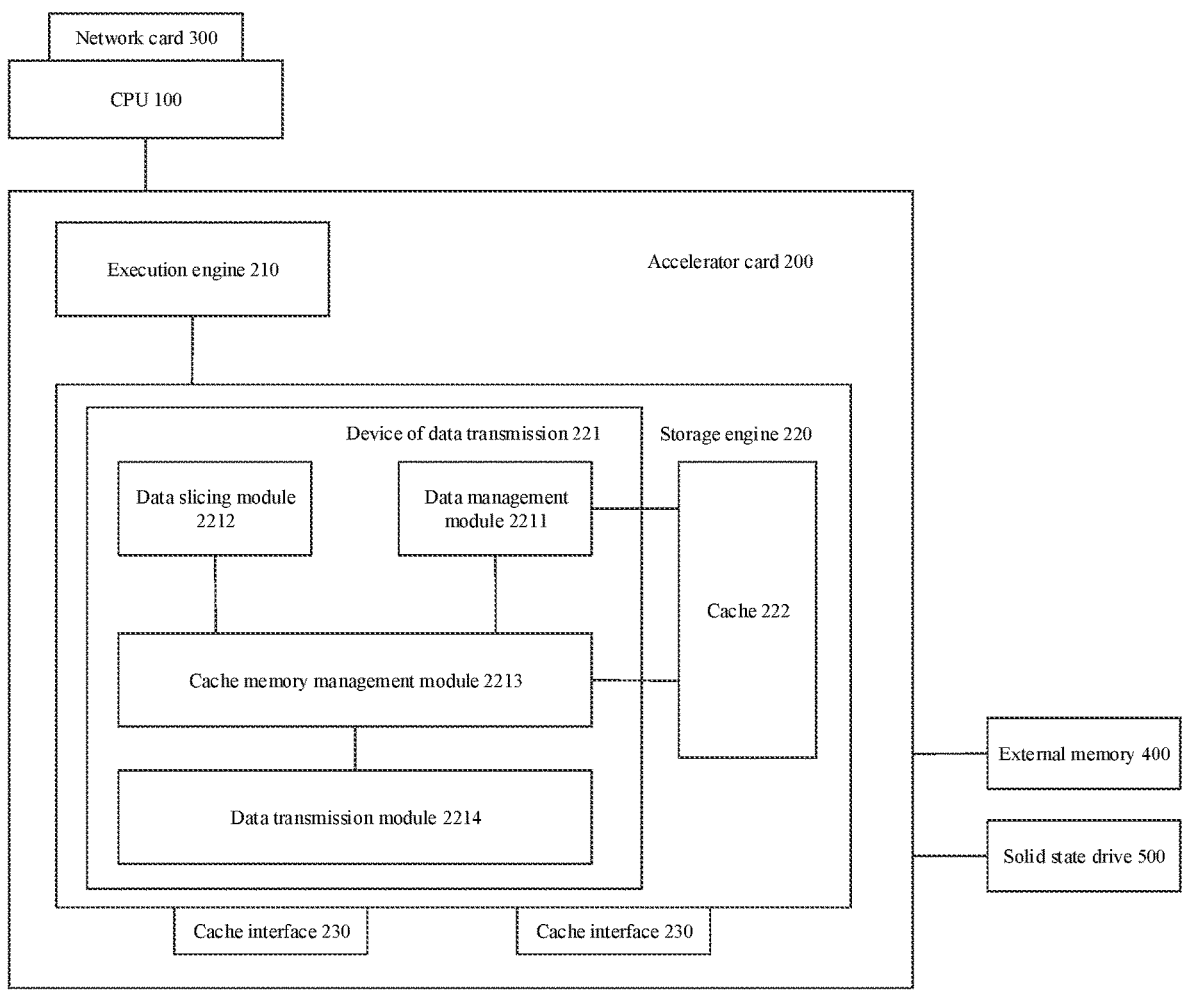
FIG. 3 illustrates a schematic diagram of the single node architecture of the distributed database in embodiments of the present invention.

This application embodiment also presents a device of data transmission, applied to a distributed database comprising a plurality of nodes, with accelerator cards provided in at least two of the nodes, the high-speed interfaces of each the accelerator card is interconnected to form a data transmission path, the device is set in the accelerator card, as shown in FIG. 3, the device of data transmission 221 comprises:

a data management module 2211, generating a data request based on the get data operation or the modify data operation, sending the data request to a cache memory management module 2213 and receiving an indication of received target data returned by the cache memory management module 2213;

a data slicing module 2212, completing the slicing of database data according to a predetermined slicing principle and then storing each slice in the external memory 400 of each node, and providing the data management module 2211 with information on the distribution of each slice;

the cache memory management module 2213, detecting whether the target data is hit in the cache 222 based on the data request, and fetching the target data from the cache 222 when it is hit, and sending the data request to the data transmission module 2214 and fetching the target data received by the data transmission module 2214 from the destination node when it is not hit.

the data transmission module 2214, packing and unpacking data, as well as sending and receiving data request messages corresponding to the data request through the data transmission path, and transmitting data at a predetermined data granularity based on the type of the cache interface 230;

wherein the get data operation comprises a scan action, the modify data operation comprises insert, update and delete actions, and the data request comprises the information of the destination node, the content of the target data and the data volume of the target data.

In this embodiment, the data management module 2211 is connected to the cache 222, the data slice module 2212, and the cache memory management module 2213, respectively, and the data slice module 2212 is also connected to the cache memory management module 2213, and the cache memory management module 2213 is also connected to the data transmission module 2214 and the cache 222.

The operation of generating a data request is implemented and executed based on the distribution information of each slice of the target data, the cached data information of the cache 222 in the accelerator card 200, the communication bandwidth and latency information of each node, and the subsequent execution operations corresponding to the target data, and the data management module 2211 can generate a data request and send the data request to the cache memory management module 2213, and it is also used to further initiate a request for data redistribution based on the accumulated data read information, reducing the bandwidth consumption of data remote transmission. The data management module 2211 is also used to perform aging of cache data, swapping out and writing back of dirty pages. The data slicing module 2212 is also responsible for slicing data replication backups to ensure data reliability. The cache management module ensures cache coherency and implements some of the RDMA functions. The data transmission module 2214 relies on different types of high-speed interfaces to achieve different transmission capabilities, for example, if the interface type is Eth, the corresponding PCS/PMA/PMD is implemented, and if the interface type is RoCEv2, the corresponding protocol stack is implemented. The pre-defined data granularity is related to the way the database storage engine data is organized. For example, in the case of PostgreSQL, the preset data granularity is an integer multiple of 8 KB.

The data in the cache 222 can also be stored in accordance with the data organization, for example, it is also stored as an integer number of data blocks of 8 KB in size. The request data size generated by the data management module 2211 is also in the basic unit of the corresponding preset data granularity.

In order to reliably execute the database operation instructions, in some embodiments of the present, as shown in FIG. 3 the data management module 2211, the data slicing module 2212, the cache memory management module 2213, the data transmission module 2214 and the cache 222 comprise a storage engine 220 of the accelerator card 200, the accelerator card 200 further comprising an execution engine 210, the data management module 2211 returning the target data, or modified interim results, or modified original data to the execution engine 210, to cause the execution engine 210 to execute database operation instructions issued by the CPU 100 of the node;
wherein the cache memory management module 2213 modifies the original data based on the slice information of the original data, and saves the modified original data in the cache 222.

In order to ensure cache consistency and data transmission efficiency, in some embodiments of this, the cache memory management module 2213 receives data packets returned from the destination node and uses the net load of data extracted from the packets as target data, and saves the target data in the cache 222 based on a cache coherency protocol, and completes memory registration and queue management based on an RDMA protocol;
wherein the target data saved based on the cache coherency protocol is identified by a slice node identification, a transaction ID, a transaction status, a database ID, a table ID, a data block, and a tuple.

To further improve the efficiency of data transmission, in some embodiments of the present application, the data transmission module 2214 pre-establishes a guaranteed bandwidth OSUFlex/ODUflex pipe for each pair of nodes based on OTN interface or adds node ID identification to the ODUflex/OSUflex frame header for routing based on OTN interface.

Specifically, OTN as a traditional time-division multiplexing transmission interface, has certain advantages over statistical multiplexing-based packet ports in terms of transmission latency, compared to Ethernet interfaces or FC, IB (InfiniBand wireless bandwidth) interfaces, OTN interfaces can further reduce transmission latency and ensure service bandwidth and data integrity.

For reliable data transmission, in some embodiments of this application, as shown in FIG. 3, the accelerator card 200 is connected to the CPU 100 based on the PCIe interface, the accelerator card 200 is also connected to the solid state drive 500, and the CPU 100 is also connected to the network card 300.

By applying the above technical solution, in a distributed database including multiple nodes, at least two nodes are equipped with accelerator cards, and the high-speed interfaces of each the accelerator card is interconnected to form a data transmission path, the device of data transmission is set in the accelerator card, comprising: a data management module, generating a data request based on the get data operation or the modify data operation, sending the data request to a cache memory management module and receiving an indication of received target data returned by the cache memory management module; a data slicing module, completing the slicing of database data according to a predetermined slicing principle and then storing each slice in the external memory of each node, and providing the data management module with information on the distribution of each slice; the cache memory management module, detecting whether the target data is hit in the cache based on the data request, and fetching the target data from the cache when it is hit, and sending the data request to the data transmission module and fetching the target data received by the data transmission module from the destination node when it is not hit; the data transmission module, packing and unpacking data, as well as sending and receiving data request messages corresponding to the data request through the data transmission path, and transmitting data at a predetermined data granularity based on the type of the cache interface; wherein the get data operation comprises a scan action, the modify data operation comprises insert, update and delete actions, and the data request comprises the information of the destination node, the content of the target data and the data volume of the target data.

In order to further elaborate the technical idea of embodiments of the present invention, the technical solution of embodiments of the invention is described in the context of a specific application scenario.

Take TPC-C test as an example, the database analysis engine, optimization engine and part of the execution engine are PostgreSQL. And the concurrency is distributed by statements. However, the granularity and strategy of concurrency in distributed database is not the only one, so only such strategy is described here.

Figure 4:
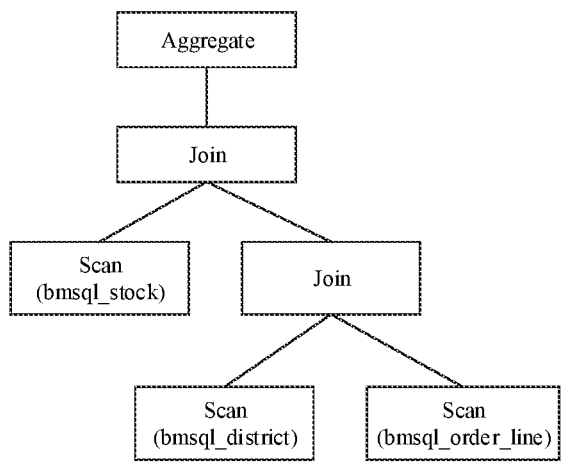
FIG. 4 illustrates a schematic diagram of an execution tree in an embodiment of the present invention.

The SQL statement to start querying the warehouse inventory status is as follows:
SELECT count(*) As low_stock FROM (SELECT s_w_id, s_i_id s_quantity FROM bmsql_stock WHERE s_w_id=? AND s_quantity<? AND s_i_id IN (SELECT ol_i_id FROM bmsql_district JOIN bmsql_order_line ON ol_w_d=d_w_id AND ol_d_id=d_id AND ol_o_id>=d_next_o_id=20 AND ol_o_id<d_next_o_id WHERE d_w_id=? AND d_id=?)) AS L;
After setting the corresponding parameters, the output execution tree is shown in FIG. 4.

Table bmsql_district has small data volume, while table bmsql_stock and bmsql_order_line have large data volume, the data slicing module stores the complete bmsql_district in multiple nodes; table bmsql_stock and bmsql_order_line are hashed consistently according to key columns (key index and primary key), then the data of the two tables are distributed in multiple nodes.

Assume that the plan tree as a whole is sent to a node to start execution.

The execution engine asks for the bmsql_district and bmsql_order_line data, and issues a list of successive operations, including Join-get bmsql_stock data -Join-Aggr, the data management module gets the data distribution information from the data slicing module, gets the distribution of bmsql_district all in this node, and the distribution of bmsql_order_line; also get the information about the current space capacity of the cache, the cached data information (from what node, which table, which data blocks, etc.).

Further, the data management module, based on the communication bandwidth and communication delay information of each node, combined with the distribution information of table data, to obtain the delay cost of Scan data, and then combined with the execution throughput of Join and the cost of Scan (bmsql_stock), the data management module generates the corresponding data request, the data request includes which nodes in turn, how many data blocks to obtain, and how much data to start returning to the execution engine after obtaining the amount of data. For example, a data request for bmsql_stock may be added here.

The data management module sends the generated data request to the cache memory management module, and if the cache is not hit, the data request is further sent to the data transmission module, which generates the data request message based on the destination node information and completes the corresponding processing, and then sends the data request message through the high-speed interface of the accelerator card.

After the remote destination node receives the data request message, it is passed to the cache memory management module of the accelerator card in the destination node, which first gets the Cache data, and if it is not hit, it gets the data from the external memory RAM (Random Access Memory) and saves it in the Cache, also needs to complete the corresponding operation based on the cache coherence protocol. The cache-related information is also stored for the data management module. After the data is acquired, it is transmitted back to the requesting node through the data transmission module.

When the data transmission module receives the data packet from the destination node. After extracting the data net load, it is passed to the cache memory management module, which saves the acquired data in the Cache, and returns the received data instructions to the data management module after completing the cache consistency protocol processing.

When the received data meets the broad value set by the data management module, it starts to return data to the execution engine.

Figure 5:
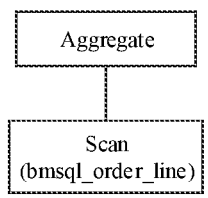
FIG. 5 illustrates a schematic diagram of another execution tree in an embodiment of the present invention.

When the node is reassigned to execute another SQL statement of TPC-C, the statement is as follows:

SELECT sum(ol_aumount) As sum_ol_amount FROM bmsql_order_line WHERE ol_w_id=? AND ol_d_id=? And ol_o_id=?;

After setting the corresponding parameters to values, the output execution tree is shown in FIG. 5.

When the data management module receives the data request and command list from the execution engine, it also obtains the relevant information from the data slicing module and the cache memory management module, and generates the relevant data request for transmission to the memory management module. The data request can directly hit the Cache, and the cache memory management module will return the received data indication to the data management module directly after the consistency protocol processing.

The current on-chip Cache can already be integrated with a capacity of GB. Although it is large enough, it still faces the situation that cache data needs to be swapped out, and the situation that Cache data is written back to RAM, which is done by the data management module. In addition to the usual LRU (Least Recently Used) scheme, the cache replacement strategy should also be judged together with the command list.

Finally, it should be noted that: the above examples are only used to illustrate the technical solution of this application, not to limit it; although the application is described in detail with reference to the preceding examples, the ordinary skilled person in this city should understand: it is still possible to modify the technical solution recorded in the preceding examples, or to replace some of the technical features; and these modifications or replacements does not drive the essence of the corresponding technical solution away from the spirit and scope of each embodiment of the present application.

Although the invention has been illustrated and described in greater detail with reference to the exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method of data transmission, applied to a distributed database comprising a plurality of nodes, with accelerator cards provided in at least two of the nodes, wherein high-speed interfaces of each the accelerator card is interconnected to form a data transmission path, the method comprising:
when the accelerator card receives a database operation command from the CPU of the node requesting access to target data, generating a data request based on a get data operation or a modify data operation;
the accelerator card detects whether the target data is hit in a cache based on the data request;
if it is hit, the accelerator card fetches the target data from the cache;
if it is not hit, the accelerator card sends a data request message corresponding to the data request to a distant destination node via the data transmission path, and obtains the target data based on a data packet returned from the destination node; and
wherein the get data operation includes a scan action, the modify data operation includes Insert, update and delete actions, and the data request includes the information of the destination node, the content of the target data and the data volume of the target data;
wherein obtaining the target data based on the data packet returned from the destination node, includes:
an operation of generating a data request is implemented and executed based on information about a distribution of each slice of the target data, information about the cached data in the cache in the accelerator card, information about the communication bandwidth and latency of each the node, and subsequent execution operations corresponding to the target data;

the accelerator card taking the net load of data extracted from the packets as target data and storing the target data in the cache based on a cache coherency protocol;

wherein the target data saved based on the cache coherency protocol is identified by a slice node identification, a transaction ID, a transaction status, a database ID, a table ID, a data block, and a tuple.

2. The method according to the claim 1, wherein the method further comprising:

the accelerator card completes memory registration and queue management based on RDMA protocol.

3. The method according to the claim 1, wherein the method further comprising:

when the accelerator card receives a data request message from a remote requesting node, detecting whether the target data is hit in the cache based on the data request message;

if it is hit, the accelerator card extracts the target data from the cache and transmits the target data back to the requesting node via the data transmission path; and if it is not hit, the accelerator card fetches the target data from the external memory and saves the target data in the cache based on the cache coherency protocol and fetches the target data from the cache and transmits the target data back to the requesting node via the data transmission path.

4. The method according to the claim 1, wherein the method further comprising:

when the accelerator card receives a database operation instruction from the CPU to modify a temporary intermediate result, completing the modification of the temporary intermediate result based on the contents of the cache; and when the accelerator card receives a database operation instruction from the CPU to modify the original data, modifying original data based on a slice information of the original data, and saving the modified original data in the cache based on a cache coherency protocol.

5. A device of data transmission, applied to a distributed database comprising a plurality of nodes, with accelerator cards provided in at least two of the nodes, wherein the high-speed interfaces of each the accelerator card is interconnected to form a data transmission path, the device is set in the accelerator card, comprising:

a data management module, generating a data request based on the get data operation or the modify data operation, sending the data request to a cache memory management module and receiving an indication of received target data returned by the cache memory management module;

a data slicing module, completing the slicing of database data according to a predetermined slicing principle and then storing each slice in the external memory of each node, and providing the data management module with information on the distribution of each slice;

the cache memory management module, detecting whether the target data is hit in the cache based on the data request, and fetching the target data from the cache when it is hit, and sending the data request to the data transmission module and fetching the target data received by the data transmission module from the destination node when it is not hit;

the data transmission module, packing and unpacking data, as well as sending and receiving data request messages corresponding to the data request through the data transmission path, and transmitting data at a predetermined data granularity based on the type of the cache interface; and wherein the get data operation comprises a scan action, the modify data operation comprises insert, update and delete actions, and the data request comprises the information of the destination node, the content of the target data and the data volume of the target data;

wherein the cache memory management module receives data packets returned from the destination node and uses a net load of data extracted from the packets as target data, and saves the target data in the cache based on a cache coherency protocol, and completes memory registration and queue management based on an RDMA protocol;

wherein the target data saved based on the cache coherency protocol is identified by a slice node identification, a transaction ID, a transaction status, a database ID, a table ID, a data block, and a tuple.

6. The device according to the claim 5, wherein the data management module, the data slicing module, the cache memory management module, the data transmission module and the cache comprise a storage engine of the accelerator card, the accelerator card further comprising an execution engine, the data management module returning the target data, or modified interim results, or modified original data to the execution engine, to cause the execution engine to execute database operation instructions issued by the CPU of the node;

wherein the cache memory management module modifies the original data based on the slice information of the original data, and saves the modified original data in the cache.

7. The device according to claim 5, wherein the data transmission module pre-establishes a guaranteed bandwidth Flexible Optical Service Unit (OSUFlex) or Flexible Optical Data Unit (ODUflex) pipe for each pair of nodes based on OTN interface or adds node ID identification to the ODUflex/OSUflex frame header for routing based on OTN interface.

* * * * *